L. D. & P. A. DROUARD.
APPARATUS FOR THE SEPARATION OF THE SAND AND WATER RAISED IN DREDGING GRAVEL.
APPLICATION FILED APR. 1, 1912. RENEWED FEB. 11, 1916.

1,190,224. Patented July 4, 1916.

UNITED STATES PATENT OFFICE.

LEON DÉSIRÉ DROUARD AND PAUL ARMAND DROUARD, OF ROUEN, FRANCE.

APPARATUS FOR THE SEPARATION OF THE SAND AND WATER RAISED IN DREDGING GRAVEL.

1,190,224.

Specification of Letters Patent. Patented July 4, 1916.

Application filed April 1, 1912, Serial No. 687,922. Renewed February 11, 1916. Serial No. 77,807.

*To all whom it may concern:*

Be it known that we, LEON DÉSIRÉ DROUARD and PAUL ARMAND DROUARD, both public-works contractors and citizens of the Republic of France, residing at $2^{bis}$ Boulevard Jeanne d'Arc, in the city of Rouen, in the Republic of France, have invented certain new and useful Improvements in Apparatus for the Separation of the Sand and Water Raised in Dredging Gravel, of which the following is a specification.

This invention relates to improvements in apparatus for the separation of the sand and water raised in dredging gravel; and an object of this invention is to provide an apparatus of the character just referred to which will be simple in construction, comparatively cheap in manufacture and efficient in operation and use.

When gravel is dredged for the purpose of metaling railroad tracks and roads, there is usually obtained besides the gravel, a considerable quantity of sand, generally contaminated by clay and other earthy constituents.

Now the device to which this invention relates is designed to obtain the sand in a pure condition in connection with the same plant, by which the gravel is sorted, broken up and transported for the purpose of loading.

The device consists of a bowl which by means of three perforated screens, which close the feed side, is divided into an inner and an outer chamber, the arrangement being such that there is arranged in the inner chamber an elevator which continuously raises the cleansed sand and conveys it to be loaded, while the slimy and dissolved earthy constituents pass through the screens into the outer chamber whence they are removed through a channel.

The accompanying drawings show by way of example one means of carrying the invention into practice.

Figure 1:
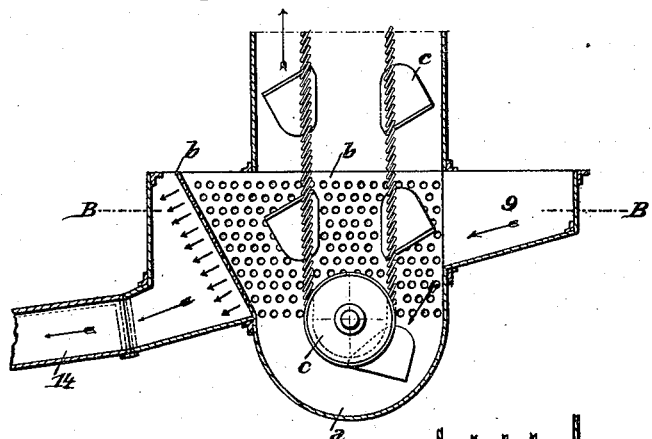
Figure 2:
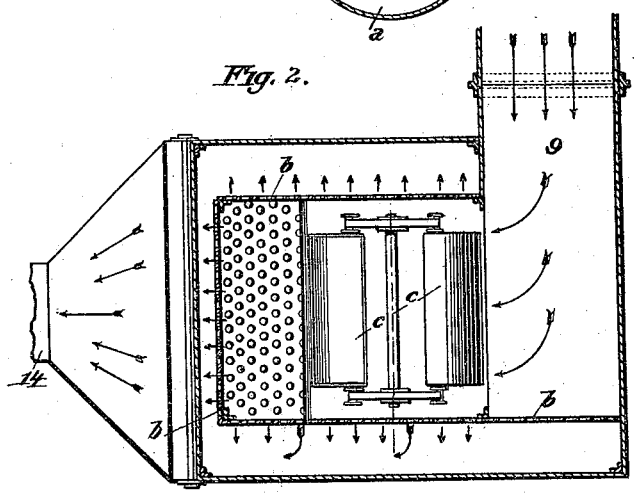

Figure 1 is a vertical section on an enlarged scale through a portion of the device, and Fig. 2 is a horizontal section on the line B—B of Fig. 1.

The sand and the mud pass through the channel 9 into the bowl $a$, wherein there are arranged three perforated partitions $b$, which divide it into an inner and outer compartment. The sand remains in the inner compartment, while the dirty water flows into the outer compartment and passes away through the channel 14. In the inner compartment there is arranged lifting mechanism $c$, which raises the cleansed sand and throws it upon a conveying band (not shown), by which it is mechanically transported. By this means there is obtained from the dredged material in addition to the gravel a valuable by-product in a condition suitable for immediate use, as its clay and earthy constituents have been washed away by the flushing water and removed out of the range of the dredger (not shown).

What we claim as our invention is:

A separator of the character described, comprising a bowl which forms the bottom of the separator; a conveyer which passes down to the bottom of the bowl; screen-like vertically-disposed walls which rise from said bowl on three sides and form the walls of an inner foraminated compartment one side of which is open to permit the free ingress thereinto of the stream of dredged sand from that side; an inlet conduit through which the dredged sand passes into the bowl; and an outlet conduit through which is led off the stream of muddy water flowing through said walls from said inner compartment.

In testimony whereof we have affixed our signatures in presence of two witnesses.

LEON DÉSIRÉ DROUARD.
PAUL ARMAND DROUARD.

Witnesses:
RENÉ LÉON PIERRE GUIBERT LASSARD,
LUCIEN MEMMINGER.

Copies of this patent may be obtained for five cents each, by addressing the "Commissioner of Patents, Washington, D. C."